United States Patent
Rune et al.

(10) Patent No.: US 9,769,725 B2
(45) Date of Patent: Sep. 19, 2017

(54) METHOD AND BASE STATION FOR HANDOVER CONTROL IN A WIRELESS NETWORK HAVING CELL LAYERS WITH DIFFERENT UPLINK (UL) AND DOWNLINK (DL) RESOURCE ALLOCATIONS

(75) Inventors: Johan Rune, Lidingö (SE); Sara Landström, Luleå (SE); Arne Simonsson, Gammelstad (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 769 days.

(21) Appl. No.: 14/119,374

(22) PCT Filed: Jun. 1, 2011

(86) PCT No.: PCT/SE2011/050688
§ 371 (c)(1),
(2), (4) Date: Nov. 21, 2013

(87) PCT Pub. No.: WO2012/166029
PCT Pub. Date: Dec. 6, 2012

(65) Prior Publication Data
US 2014/0187243 A1 Jul. 3, 2014

(51) Int. Cl.
*H04W 36/00* (2009.01)
*H04W 36/26* (2009.01)
(Continued)

(52) U.S. Cl.
CPC ........... *H04W 36/26* (2013.01); *H04W 36/04* (2013.01); *H04W 36/0083* (2013.01); *H04W 36/22* (2013.01)

(58) Field of Classification Search
CPC ..... H04W 36/18; H04W 36/20; H04W 52/40; H04W 72/082; H04W 36/0005;
(Continued)

(56) References Cited

U.S. PATENT DOCUMENTS 6,266,531 B1 * 7/2001 Zadeh .................. H04W 16/06
455/436
2004/0029588 A1 2/2004 Kikuma et al.
(Continued)

FOREIGN PATENT DOCUMENTS

GB 2 392 347 A 2/2004

OTHER PUBLICATIONS

3GPP TS 36.423 V10.0.0. 3rd Generation Partnership Project; Technical Specification Group Radio Access Network; Evolved Universal Terrestrial Access Network (E-UTRAN); X2 application protocol (X2AP) (Release 10). Dec. 2010.

*Primary Examiner* — Xiang Zhang
*Assistant Examiner* — Edward Zhang

(57) ABSTRACT

A base station (BS) and method for controlling handover in a wireless communication system. The BS serves a first cell in a first cell layer overlapping with a second cell layer, and the first cell has a different distribution of configured amounts of uplink and downlink resources than a second cell in the second cell layer. The BS monitors amounts of uplink and downlink resources utilized by a user equipment (UE) in the first cell and adjusts at least one parameter controlling handover of the UE to the second cell based on the resources utilized by the UE, and on information regarding configured amounts of uplink and downlink resources in the first and second cells. This increases the likelihood that the UE will be served by one of the first and second cells in which the configured amounts of resources better matches the amounts of resources utilized by the UE.

18 Claims, 6 Drawing Sheets

(51) Int. Cl.
*H04W 36/04* (2009.01)
*H04W 36/22* (2009.01)

(58) Field of Classification Search
CPC ............. H04W 36/04; H04W 72/0453; H04W 72/048; H04W 16/14; H04W 28/18; H04W 72/04; H04B 17/382; H04B 7/022
USPC .................................. 455/436–444; 370/331
See application file for complete search history.

(56) References Cited

U.S. PATENT DOCUMENTS

| | | | |
|---|---|---|---|
| 2005/0141450 A1* | 6/2005 | Carlton | ................ H04W 36/26 370/329 |
| 2006/0077931 A1 | 4/2006 | Lee et al. | |
| 2009/0046665 A1 | 2/2009 | Robson et al. | |

* cited by examiner

METHOD AND BASE STATION FOR HANDOVER CONTROL IN A WIRELESS NETWORK HAVING CELL LAYERS WITH DIFFERENT UPLINK (UL) AND DOWNLINK (DL) RESOURCE ALLOCATIONS

TECHNICAL FIELD

The disclosure generally relates to control of handovers between cell layers in a wireless communication system. In particular it relates to a method in a base station of a wireless communications system for controlling handover and to a base station serving a first cell in a first cell layer overlapping with a second cell layer, wherein the first cell has a different distribution of configured amounts of uplink and downlink resources than a second cell in the second cell layer.

BACKGROUND

The Universal Mobile Telecommunication System (UMTS) is one of the 3G mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS system and Evolved UTRAN (E-UTRAN) is the radio access network of an LTE system. The complete cellular system that comprises an LTE system (and thus E-UTRAN) is denoted Evolved Packet System (EPS). As illustrated in FIG. 1, a radio access network typically comprises user equipments (UE) 150a-b wirelessly connected to base stations (BS) 110a-c, commonly referred to as NodeB in UTRAN and eNodeB in E-UTRAN. Each BS 110a-c serves one or more areas each referred to as cells 120a-c.

One of the hot topics for future developments of cellular systems is heterogeneous networks, also known as HetNets. Heterogeneous networks are networks with a mixed deployment of cells of widely different sizes, such as macro cells, micro cells, pico cells, and femto cells. The cells may either cover overlapping areas, e.g., when the area covered by a pico cell is also covered by a macro cell, or they may complement each other's coverage. Smaller cells, such as pico cells, will typically be overlapping with other cells. They will be used, e.g., to provide increased capacity at locations with dense user populations and high traffic volumes, so called hotspots, or to provide improved coverage, e.g., in terms of better channel quality at certain indoor locations.

An interesting scenario, illustrated in FIG. 2, is where an operator has licenses for both a Frequency Division Duplex (FDD) and a Time Division Duplex (TDD) spectrum in different spectrum bands. The operator may then deploy a macro cell 220a coverage, i.e., a macro cell layer, in the FDD spectrum, and smaller cells such as pico cells 220b-c, providing additional complementing or overlapping scattered coverage spots in the TDD spectrum. The pico cells thus form a TDD pico cell layer and the macro cells form an overlay FDD macro cell layer. In the scenario illustrated in FIG. 2, the TDD pico cells 220b-c are isolated from each other. This may however not always be the case.

The paired FDD spectrum is typically uplink (UL)/downlink (DL) symmetric, i.e., there is equal bandwidth assigned to UL and to DL communication. The TDD spectrum on the other hand is time-wise divided between UL and DL traffic, typically in an asymmetric fashion, where the DL is usually, although not always, assigned more capacity than the UL. The distribution of configured amounts of UL and DL resources is thus different in the paired FDD spectrum and in the TDD spectrum.

One problem, in particular with FDD, is that it is difficult to achieve a good matching of the distribution of configured UL/DL spectrum resources to an UL/DL distribution of the actual traffic. Heavy DL traffic may for instance more or less fully load the configured DL resources of a paired FDD spectrum, while there are still plenty of unused UL resources in the spectrum. The situation is slightly better for TDD due to its greater flexibility in reallocation of resources between UL and DL. However, even though TDD cells may be configured with different degrees of UL/DL resource asymmetry, the UL/DL distribution of the traffic may vary in a manner and on a time scale which is unrealistic to match with repeated reconfigurations of the distribution of UL/DL resources. Furthermore, reconfigurations of the UL/DL resources in adjacent TDD cells have to be synchronized to avoid severe UE to UE inter-cell interference, unless the TDD cells are completely isolated from each other. Such synchronization of the resource reconfigurations complicates dynamic reallocation of UL/DL resources in TDD scenarios.

SUMMARY

It is therefore an object to address some of the problems outlined above, by allowing a base station to control handovers between cells in two cell layers with different distributions of configured amounts of UL and DL resources, based on information about current UE traffic in UL and DL and on information regarding configured amounts of uplink and downlink resources in the two cells. A UE may thus be directed to the cell with a good match to the UL/DL distribution of the current UE traffic, with regards to the distribution of configured amounts of UL and DL resources. This object and others are achieved by the method and the base station according to the independent claims, and by the embodiments according to the dependent claims.

In accordance with one embodiment, a method in a first base station of a wireless communications system for controlling handover is provided. The first base station is serving a first cell in a first cell layer overlapping with a second cell layer. The first cell has a different distribution of configured amounts of uplink and downlink resources than a second cell in the second cell layer. The method comprises monitoring amounts of uplink and downlink resources used by a first user equipment in the first cell, and adjusting at least one parameter controlling a handover of the first user equipment to a second cell in the second cell layer. The adjusting is based on the monitored amounts of uplink and downlink resources used by the first user equipment, and on information regarding configured amounts of uplink and downlink resources in the first and the second cell respectively, such that it is more likely that the first user equipment will be served by a cell with a good match to a distribution of the monitored amounts of uplink and downlink resources with regards to a distribution of the configured amounts of uplink and downlink resources.

In accordance with another embodiment, a first base station configured to be used in a wireless communications system is provided. The first base station is also configured to control handover and to serve a first cell in a first cell layer overlapping with a second cell layer, wherein the first cell has a different distribution of configured amounts of uplink and downlink resources than a second cell in the second cell layer. The first base station comprises a processing unit configured to monitor amounts of uplink and downlink resources used by a first user equipment in the first cell, and to adjust at least one parameter controlling a handover of the first user equipment to a second cell in the second cell layer. The adjust is based on the monitored amounts of uplink and downlink resources used by the first user equipment, and on information regarding configured amounts of uplink and downlink resources in the first and the second cell respectively, such that it is more likely that the first user equipment will be served by a cell with a good match to a distribution of the monitored amounts of uplink and downlink resources with regards to a distribution of the configured amounts of uplink and downlink resources.

An advantage of embodiments is that a better match between the distributions of configured UL/DL resources and of UL/DL traffic is enabled, which allows for an efficient utilization of spectrum resources.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of a method and device, they may also be embodied in a computer program product as well as in a system comprising a computer processor and a memory coupled to the processor, wherein the memory is encoded with one or more programs that may perform the functions disclosed herein.

Figure 1:
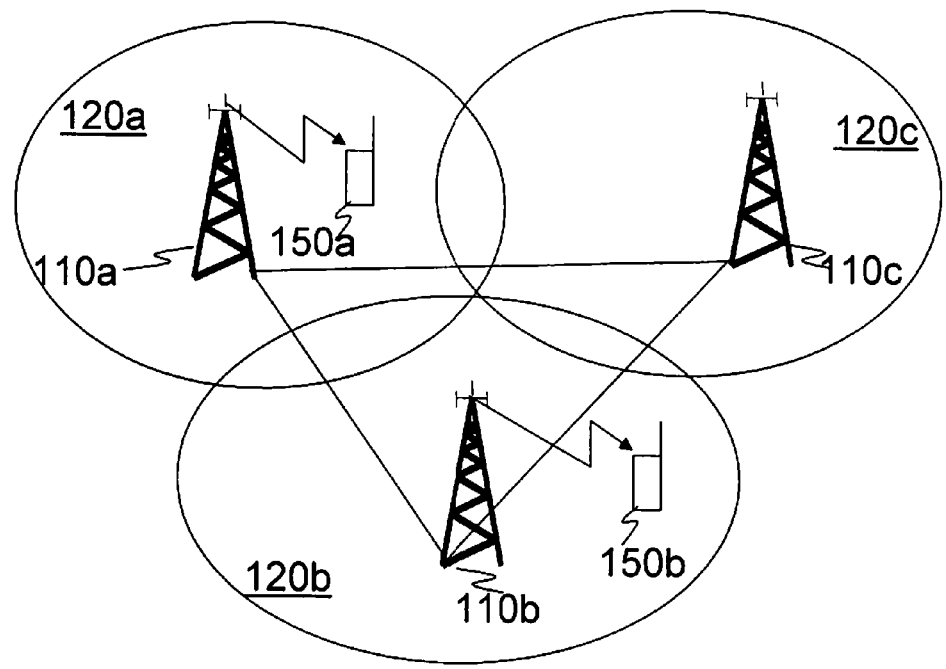
FIG. 1 is a schematic illustration of a conventional wireless communications system wherein embodiments may be implemented.
Figure 2:
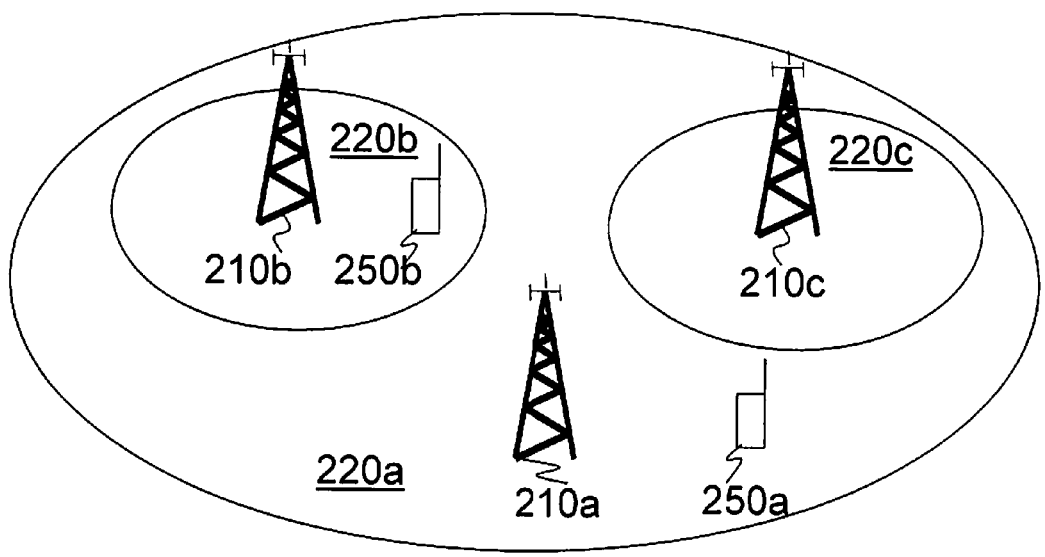
FIG. 2 is a schematic illustration of TDD pico cells in a pico cell layer with an overlay FDD macro cell layer.

Embodiments are described herein by way of reference to particular example scenarios. Particular aspects are described in a non-limiting general context in relation to a scenario involving a FDD macro cell layer and a TDD pico cell layer as illustrated in FIG. 2, where the pico cell layer has a more asymmetric distribution of the configured UL and DL resources than the macro cell layer has. However, although such a scenario is suitable for the description of the embodiments, it should be noted that the embodiments may also be applied to any scenario where the distribution of configured amounts of resources in the UL and the DL are different in two overlapping cell layers. Example scenarios where such differences may be present, other than the FDD macro cell layer and the TDD pico cell layer scenario, include an FDD pico cell layer overlaid by a TDD macro cell layer, a TDD pico cell layer overlaid by a TDD macro cell layer with a different UL/DL resource configuration than the TDD pico cell layer, and an FDD micro cell layer deployed in an asymmetric UL/DL spectrum pair and overlaid by an FDD macro cell layer with a symmetric UL/DL spectrum pair.

The problem of achieving good matching of the distribution of configured UL/DL spectrum resources with the UL/DL distribution of the actual traffic is addressed by a solution where the amounts of UL and DL resources used by a first UE in a first cell of, e.g., an FDD macro cell layer is monitored, and where the handover of the first UE to a second cell in a second cell layer such as a pico cell in a TDD pico cell layer, is controlled by adjusting handover parameters. The handover parameters are adjusted based on the monitored amounts of UL and DL resources used by the UE, and on a distribution of configured amounts of UL/DL resources in the macro and pico cell layers respectively, such that it is more likely that the first UE will be served by a cell with a good match to the distribution of the monitored amounts of uplink and downlink resources with regards to the distribution of the configured amounts of uplink and downlink resources. For instance, a UE with gravely asymmetric traffic, e.g., with generally much greater DL data volumes than UL data volumes, may primarily be steered to the TDD pico cell layer with most of its spectrum resources devoted to DL traffic by adjusting one or more handover parameters. Similarly, UEs with more symmetric traffic, or even with UL heavy traffic, could primarily be steered to the FDD macro cell layer with a more symmetric distribution of its UL and DL spectrum resources.

In one embodiment, the evaluation of which UE handovers that would be beneficial for the purpose of matching configured and used UL/DL resources is performed in a first BS serving a cell of the macro cell layer. The evaluation is based on information about the configured amounts of UL and DL resources in the concerned macro cell, i.e., in one of the first BS's own cells, and in a neighboring pico cell in the pico cell layer, together with information about the UL/DL traffic distributions of the UEs connected in the concerned macro cell. The information about the UL/DL traffic distribution of a connected UE, may be determined by monitoring the amounts of UL and DL resources used by the connected UE. The monitored amount of UL and DL resources used may be in absolute values, or in relative values.

In another embodiment, information about a current UL and DL load in the macro and/or pico cells, and/or information about resources currently available for further allocation to UEs may be exchanged between the involved nodes, primarily the involved BSs serving the macro and pico cells, and may be used as complementary or refining input data. The current load in the cells may be the total load in the cell, i.e. an absolute value of the UL and DL load added together, or of the respective UL and DL loads. It may also be a relative value of the load, such as the total load in relation to the cells total amount of configured resources, or the respective UL and DL load in relation to the cells respective amounts of configured resources.

When it is determined that it is beneficial to hand over a UE from the macro cell layer to a potential target cell of the pico cell layer, a parameter that controls handovers may be adjusted so that a handover from the macro cell is initiated earlier than normal, thus making it more likely that the UE will be served by the pico cell. Thresholds for triggering measurement reports and handover decisions are e.g. used for the control of handovers in UTRAN and E-UTRAN. By lowering the thresholds a handover of the UE to the pico cell layer may be triggered earlier. Conversely, when it is determined that it is beneficial to retain the UE in the current macro cell and macro cell layer, the thresholds may be increased, such that it is more likely that the first user equipment will be served by the macro cell.

The entity in control of the steering of UEs between the cell layers by adjusting the handover parameters may either be the BS controlling the macro cell which covers the location of the UE, i.e. the macro BS, or both the macro BS and the pico BS in combination. In the former case the macro BS may provide instructions to the pico BSs controlling their potential initiation of handovers to the macro cell. In the latter case, the macro BS and the pico BS may either operate independently or through a coordinated algorithm. Even if the BSs operate independently, they may still exchange information about configured resources and possibly load. Another possible variation is to let a higher hierarchical node, i.e. one that can exercise control over the involved BSs, control the active steering of UEs between cell layers. Examples of such nodes may be a Base Station Controller (BSC) in GSM radio network, a Radio Network Controller (RNC) in UTRAN, or a Mobility Management Entity (MME) in EPS. In some cases, some of the relevant input data is inherently available to such a controlling node. The UTRAN RNC is for example aware of the load generated by the UEs in all its controlled cells. The remaining required or desired input data may be retrieved from the involved BSs. The different embodiments where the control of the steering is performed in the BSs are described in more details hereinafter.

In one embodiment, the macro BS is in sole control of the adjustment of the parameter(s) controlling the handover. The macro cell layer BS controls the steering of UEs between its macro cell and the pico cell that the macro cell covers. The embodiment is not limited to one macro cell and one pico cell. There may be more than one macro cell served by the macro BS, and there may be more than one neighboring pico cell to which it is possible to handover. It should be noted that pico cells neighboring a macro cell typically comprise pico cells that are covered by the macro cell, but may also comprise pico cells that are partly covered by the macro cell or adjacent to the macro cell. Furthermore, in an alternative embodiment it may also be a BS in the pico cell layer that is in control of the adjustment of handover parameters.

The kind of UE steering or handover control that is addressed in this disclosure is the handover control performed for the specific purpose of achieving a better match between the UL/DL traffic distribution of UEs and the distribution of configured UL/DL spectrum resources in the cells. Handovers triggered by differences in radio channel quality between neighboring cells are handled through usual procedures, although the handover threshold values used during the handover decision process may be affected by the disclosed embodiments.

Hence, when a UE connected to the macro BS has an UL/DL traffic distribution that implies that it would be beneficial to hand it over to a pico layer cell, the macro BS may configure the UE with a lower threshold than usual for reporting measurements on the DL transmissions in pico layer cells, i.e. making such measurement reporting more easily triggered. Typically, the type of trigger event the BS would use for this measurement reporting configuration may be that the UE should send a measurement report if the difference in quality or received signal strength between the neighbor pico cell and the current macro cell decreases below a certain threshold value. The threshold value may be negative. Furthermore, when such a measurement report arrives from the UE, the macro BS may use a lower threshold than usual for triggering of a handover decision towards the pico cell, i.e. making the handover decision more easily triggered.

In the same way as it may be assessed as beneficial to hand over a UE to a cell of the other layer it may be assessed as beneficial to retain a UE in its current macro cell or macro cell layer. This is the case when the UE's UL/DL traffic distribution better matches the distribution of configured UL/DL resources in the current macro cell than in a potential target cell of the other pico cell layer. Hence, when a UE in the macro cell fulfills this condition, the macro BS may configure the UE with a higher threshold than usual for measurement reporting and may apply a higher threshold than usual for triggering of a handover decision towards the pico cell, thus making it less probable that the UE is handed over to a pico cell.

In a first embodiment, the macro BS may also inform the pico BS of what monitored UL/DL traffic distributions that make it beneficial to hand over a UE in the pico cell to the macro cell, and what monitored UL/DL traffic distributions that make it beneficial to retain the UE in the pico cell. The information may be sent across an inter-BS interface such as the X2 interface, which is the inter-eNB interface in LTE. The macro BS may also in one embodiment inform the pico BS of how much the measurement report and the handover triggering thresholds should be adjusted in the pico cell in order to control the handover as wanted. The macro BS may thus—for UEs that are beneficial to hand over to the macro cell—inform of how much the threshold values should be decreased in order to increase the probability of handover. The macro BS may also inform of how much the threshold values should be increased in order to decrease the probability of handover, for UEs that are beneficial to retain in the pico cell. The reductions and increments of the thresholds—both those applied in the macro cell and those applied in the pico cell—may depend on how beneficial a handover of a concerned UE is assessed to be as well as how beneficial it is assessed to be to retain a UE in its current cell. The assessment may be done, e.g., based on the load generated by the concerned UE or its anticipated impact on the total UL/DL traffic distribution. One example is described with reference of FIG. 3$b$ below. Thus, the reductions or increments and the applied threshold values may be different for different UEs as well as for different potential handover target cells.

In a second embodiment with a more extreme variant of the macro BS control, the pico BS informs the macro BS about the connected UEs in each pico cell, and includes each UE's monitored UL and DL traffic distribution in the information. The information may be sent on request or periodically. According to one embodiment, the pico BS may also include a load or a traffic volume incurred by each UE. Based on this information received from the pico cell, and on information about the state in the macro cell, the macro BS determines which UEs in the pico cell—if any—that would be beneficial to hand over to the macro cell. The macro BS also determines which UEs that would be beneficial to retain in the pico cell(s). The macro BS instructs the concerned pico BS(s) to decrease or increase the measurement report and handover decision thresholds for these UEs.

When determining whether it would be beneficial to move a UE to the pico or macro cell, or to retain it in its current cell, the macro BS uses the following primary information:
1. Information about the configured amounts of UL and DL resources respectively, for the concerned macro cell as well as the neighboring pico cell(s).
2. Information about the amounts of UL and DL resources used by the UE. This information may be in the form of offered traffic or traffic volume or a more refined measure that accounts for the difference in channel conditions between the macro and pico cells and the difference in resource consumption that this implies for the offered traffic. Instead of absolute measures it may also be a ratio between the UL and DL loads, based on either offered traffic or more refined measures. This information item may be obtained by monitoring the UE's recent traffic, and/or by checking a current Quality of Service (QoS) parameter such as a guaranteed bit rate of the UE's current bearer(s). If the UE is located in a pico cell, the UE traffic information may have to be transferred from the pico BS to the macro BS in some embodiments.

The information about the configured amounts of UL and DL resources in the cells mentioned in information item 1 above may be obtained in several ways:
a) The macro BS and the pico BS(s) may exchange the information across an inter-BS interface such as the X2interface. This is e.g. possible by extending the following X2AP messages defined in LTE with the information: X2 SETUP REQUEST, X2SETUP RESPONSE and ENB CONFIGURATION UPDATE.
b) The information may be obtained through an extension of the Automatic Neighbor Relation feature which is defined in LTE and will soon be defined for UMTS. With the Automatic Neighbor Relation feature the BS utilizes reports from connected UEs containing results of measurements on BS transmissions in neighbor cells to detect new neighbor cells. A UE which is requested to report information about a newly detected neighbor cell may include information about configured UL and DL resources in the detected neighbor cell in the report.
c) The macro BS may be configured, e.g., via O&M operations, with knowledge about the configured amounts of UL/DL resources in the pico cells. It may also be possible that the pico cells are configured with the corresponding information regarding the macro cell.
d) The information may be received from an entity higher up in the network architecture, e.g. a node controlling the BSs. Preferably the node is controlling both the macro BS and the concerned pico BS, such as an RNC in UMTS.

In addition to the primary information described in primary information item 1 and 2 above, the macro BS may also utilize the following secondary information:
A. Information about the current load in the macro cell.
B. Information about the current load in the neighboring pico cells.
C. Information about the UL and DL resources currently available for allocation to UEs in the pico cells. Depending on the controlling algorithm that is used for the inventive feature, this information item may optionally replace instead of complement the information about the configured amounts of UL and DL resources in the cells mentioned in primary information item 1 above.

Secondary information item A is inherently known to the macro BS. Secondary information item B and C may be obtained across an inter-BS interface such as the X2interface. The information may be obtained e.g. by extending the X2AP message LOAD INFORMATION or by defining a new request and response message pair.

Alternatively, if primary information item 1 and secondary information item B of a neighboring pico cell are known, then secondary information item C may be calculated. In a similar way, the secondary information item B may be calculated if primary information item 1 and secondary information item C of a neighboring pico cell are known.

In a third embodiment, the macro BS and the pico BS may both control the potential handovers of UEs in their respective cells, based on a distribution of configured amounts of UL and DL resources in the cells and on the distribution of monitored UE traffic as described above. This is thus an alternative to the embodiment described above, wherein one of the BS alone controls the handovers.

According to a first alternative of the third embodiment, the macro and pico BSs may operate independently, meaning that the BSs run independent control algorithms. However, it does not exclude that the BSs exchange information about, e.g., configured amounts of resources, current cell load, and/or available resources, as already described above. Macro and pico BSs may thus independently determine when it is beneficial to move a UE to the other cell layer, and when it is beneficial to retain it. They may also determine what decreased or increased threshold values that should be used for the measurement reporting and handover triggering.

According to a second alternative of the third embodiment, the macro BS may provide the pico BS(s) with some instructions regarding the threshold values, thus reducing the independency of the pico BS(s) somewhat. The macro BS may provide the pico BS with instructions on how to calculate reductions and increments of thresholds, e.g., in terms of how to derive threshold changes from input data in the form of configured amounts of UL/DL resources and a UE's monitored UL/DL traffic distribution. The macro BS may as an alternative provide the pico BS with fixed threshold reductions and increments to apply.

The involved BSs should preferably exchange information about resource configuration and load, as described above, to serve as additional input to the control algorithm. However, the BS(s) do not inform each other about UL/DL traffic distributions that make it beneficial to hand over or retain a UE, nor of which UEs to apply threshold changes to.

In a fourth embodiment, the BSs use a coordinated algorithm to decide on how to adjust the handover parameters and thus control the handovers. Each BS in a macro-pico neighbor relation evaluates potential handovers in both directions, based on internal information and information received from the other BS, as previously described. However, before executing any concrete action of modifying thresholds, a BS sends its conclusions about the potential handovers as a suggestion to the other BS, which may reject or approve the suggested action based on results from its own algorithm. The BS receiving the proposal may also return a counter proposal or a complementing proposal. The pico BS may, e.g., approve the received proposal, if its complementing proposal transmitted back to the macro BS is accepted. To serve as further refining input data in this negotiation a BS could associate a preference rating with its proposal, providing a measure of how beneficial the proposed action would be to the proposing BS.

A related phenomenon of interest is so called ping-pong handovers. When the handover related thresholds of two neighbor cells, e.g., a macro and a pico cell, are poorly matched, the result may in some cases be that a UE, which satisfies the conditions for handover from a macro to a pico cell, is handed over to the pico cell only to more or less immediately satisfy the conditions for handover from the pico to the macro cell. When the UE consequently is handed over to the macro cell, the procedure is back where it started and may start all over again, resulting in a potentially endless repetition of handovers back and forth between the two neighbor cells, until the UE moves out of the area where the two cells overlap. This phenomenon is highly undesirable, since it consumes a lot of signaling resources in the concerned cells.

A way to ensure that ping-pong handovers do not occur in conjunction with the present invention is to coordinate the setting of the handover related thresholds between neighboring cells. For example, in the fourth embodiment described above, the two base stations may negotiate how to set the handover related thresholds in the respective cell. An alternative method that may be used in conjunction with any of the above described embodiments is that one of the involved base stations, e.g. the macro base station, instructs the other base station of suitable threshold settings to avoid ping-pong handovers, or informs the other base station of its own applied threshold settings, so that the other base station can adapt its threshold settings to avoid ping-pong handovers.

Figure 3A:
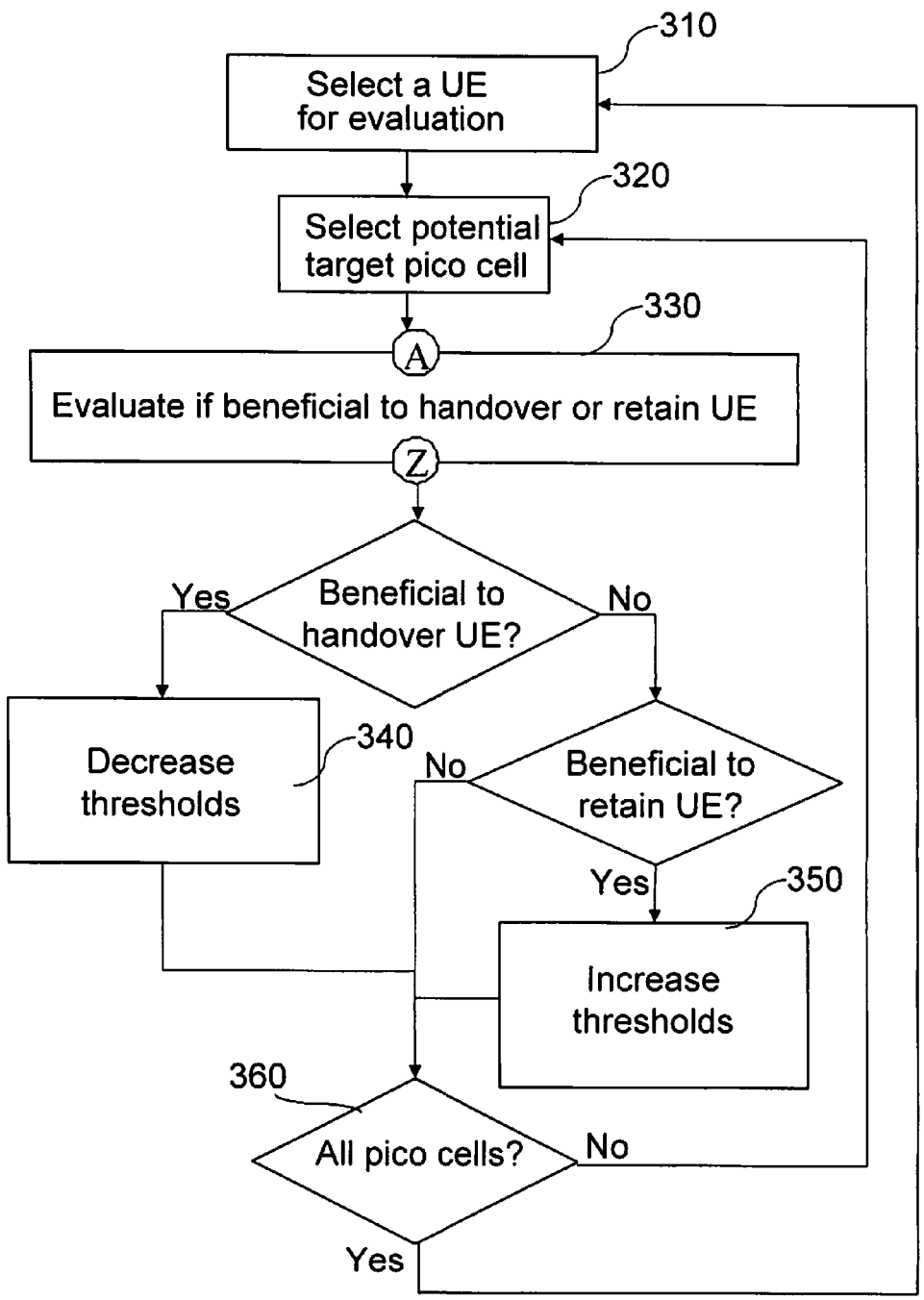
FIGS. 3a-3b are flowcharts of the method in the first BS according to embodiments.
Figure 3B:
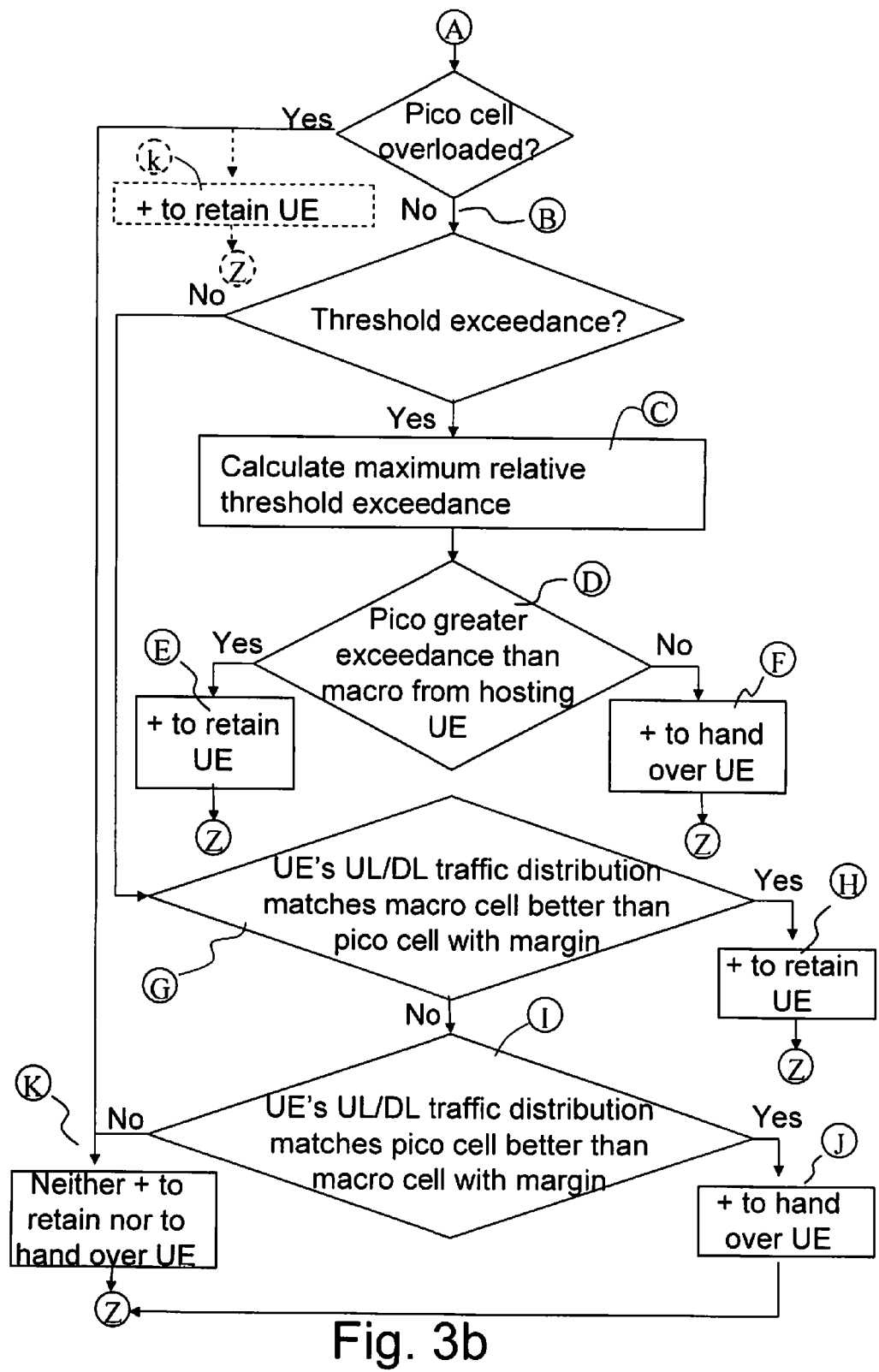

FIGS. 3a-b illustrate an example of a simple method to be run in a macro BS according to embodiments. The example assumes that each BS runs a corresponding algorithm independently, based on load information exchanged between the BSs, in accordance with the third embodiment described above. FIG. 3a is a flow chart of the overall procedure. It may be assumed that the macro BS is aware of the configured amounts of UL and DL resources in the macro and the pico cell. This information may e.g. be exchanged between the macro and pico BS, as described previously. Load information may also have been exchanged between the macro and pico BS. In step 310 a UE in the macro cell is selected for evaluation and in step 320 a potential handover target pico cell is selected. In step 330, it is evaluated if it is beneficial to handover the UE to the target pico cell. This step is further detailed in FIG. 3b and in the corresponding description below. If it is determined that it is beneficial to handover the UE to the target pico cell, the thresholds controlling the handover are decreased in step 340, and if it is determined that it is beneficial to retain the UE in the macro cell, the thresholds controlling the handover are increased in step 350. The decrease in step 340 makes it more likely that the UE will be served by the pico cell, and the increase in step 350 makes it more likely that the UE will be served by the macro cell. In step 360 it is determined if there are more target pico cells to select, and the method is reiterated from step 320 if that is the case. If all target pico cells have been checked, the method is reiterated from step 310, selecting a new UE for evaluation if there are any UEs left to select in the macro cell.

FIG. 3b is a flow chart illustrating the algorithm for evaluating whether it would be beneficial to hand over a certain UE to a certain pico cell, or whether it is beneficial to retain it in the macro cell. It thus details step 330 in the flowchart of FIG. 3a. The letter references in the flow chart in FIG. 3b correspond to the letters in the pseudo code given hereinafter. Furthermore, "beneficial" is abbreviated with a plus sign in the flowchart. "Beneficial to retain UE", is thus written "+to retain UE". The following notation is used for the pseudo code:

$M_{DLpico}$ Maximum DL resources (i.e. configured) in pico cell.

$M_{ULpico}$ Maximum UL resources (i.e. configured) in pico cell.

$M_{DLmacro}$ Maximum DL resources (i.e. configured) in macro cell.

$M_{ULmacro}$ Maximum UL resources (i.e. configured) in pico cell.

$T_{DLpico}$ Threshold indicating close to full DL load in pico cell.

$T_{ULpico}$ Threshold indicating close to full UL load in pico cell.

$T_{DLmacro}$ Threshold indicating close to full DL load in macro cell.

$T_{ULmacro}$ Threshold indicating close to full UL load in macro cell.

$A_{DLpico}$ DL resources available for further allocation in pico cell.

$A_{ULpico}$ UL resources available for further allocation in pico cell.

$A_{DLmacro}$ DL resources available for further allocation in macro cell, including the resources used by the UE being evaluted.

$A_{ULmacro}$ UL resources available for further allocation in macro cell, including the resources used by the UE being evaluated.

$C_{DLpico}$ Current DL load in pico cell.

$C_{ULpico}$ Current UL load in pico cell.

$C_{DLmacro}$ Current DL load in macro cell (including the UE being evaluated).

$C_{ULmacro}$ Current UL load in macro cell (including the UE being evaluated).

$P_{DLpico}$ Potential DL load in pico cell, if the evaluated UE is handed over to the pico cell.

$P_{ULpico}$ Potential UL load in pico cell, if the evaluated UE is handed over to the pico cell.

$U_{DL}$ (Estimated) DL load generated by the UE being evaluated (in the form of offered traffic).

$U_{UL}$ (Estimated) UL load generated by the UE being evaluated (in the form of offered traffic).

retainMargin A margin on the difference of DL/UL load-resource matching between pico and macro cell when determining whether it is beneficial to retain the UE in the macro cell.

HOMargin A margin on the difference of DL/UL load-resource matching between pico and macro cell when determining whether it is beneficial to hand over the UE to the pico cell.

Pseudo code

Ⓐ
$A_{DLpico} = M_{DLpico} - C_{DLpico}$; $A_{ULpico} = M_{ULpico} - C_{ULpico}$;
 //Calculated, unless already
 //explicitly transferred from pico BS.

-continued

Pseudo code $A_{DLmacro} = M_{DLmacro} - C_{DLmacro} - U_{DL}$; $A_{ULmacro} = M_{ULmacro} - C_{ULmacro} - U_{UL}$;
$P_{DLpico} = C_{DLpico} + U_{DL}$; $P_{ULpico} = C_{ULpico} + U_{UL}$;
IF $U_{DL} > A_{DLpico}$ OR $U_{UL} > A_{ULpico}$ {        //The pico cell would be overloaded.
Ⓚ
evaluationResult = 'no active steering beneficial';
                                            //alternatively Ⓚ 'beneficial to
                                            //retain UE'.
}
Ⓑ
ELSE IF $P_{DLpico} > T_{DLpico}$ OR $P_{ULpico} > U_{ULpico}$ OR $C_{DLmacro} > T_{DLmacro}$ OR $C_{ULmacro} > T_{ULmacro}${
Ⓒ

$$R = \max\left(\frac{P_{DLpico}}{T_{DLpico}}, \frac{P_{ULpico}}{T_{ULpico}}, \frac{C_{DLmacro}}{T_{DLmacro}}, \frac{C_{ULmacro}}{T_{ULmacro}}\right);$$
                                            //R = maximum relative threshold
                                            //exceedance.
Ⓓ

IF $R = \frac{P_{DLpico}}{T_{DLpico}}$ OR $R = \frac{P_{ULpico}}{T_{ULpico}}$ {        //The pico cell would get greater
                                            //relative threshold exceedance than
                                            //the macro cell from hosting the UE.
Ⓔ
    evaluationResult = 'beneficial to retain UE';
}
ELSE {                                      //The pico cell would get smaller
                                            //relative threshold exceedance than
                                            //the macro cell from hosting the UE.
Ⓕ
    evaluationResult = 'beneficial to hand over UE';
}
}
Ⓖ
ELSE IF $\left|\frac{U_{DL}}{U_{UL}} - \frac{A_{DLpico}}{A_{ULpico}}\right| \geq \left|\frac{U_{DL}}{U_{UL}} - \frac{A_{DLmacro}}{A_{ULmacro}}\right|$ + retainMargin {
                                            //The UE's UL/DL traffic distribution
                                            //matches the macro cell better than
                                            //the pico cell with a margin
                                            //(retainMargin).
Ⓗ
    evaluationResult = 'beneficial to retain UE';
}
Ⓘ
ELSE IF $\left|\frac{U_{DL}}{U_{UL}} - \frac{A_{DLpico}}{A_{ULpico}}\right| < \left|\frac{U_{DL}}{U_{UL}} - \frac{A_{DLmacro}}{A_{ULmacro}}\right|$ − HOMargin {
                                            //The UE's UL/DL traffic distribution
                                            //matches the pico cell better than
                                            //the macro cell with a margin
                                            //(HOMargin).
Ⓙ
    evaluationResult = 'beneficial to hand over UE';
}
ELSE {                                      //The difference in how well the UE's
                                            //UL/DL traffic distribution matches the
                                            //macro cell and the pico cell
                                            //respectively is not large enough to
                                            //motivate any particular active
                                            //steering action.
Ⓚ
    evaluationResult = 'no active steering beneficial';
}
Ⓩ

Figure 4A:
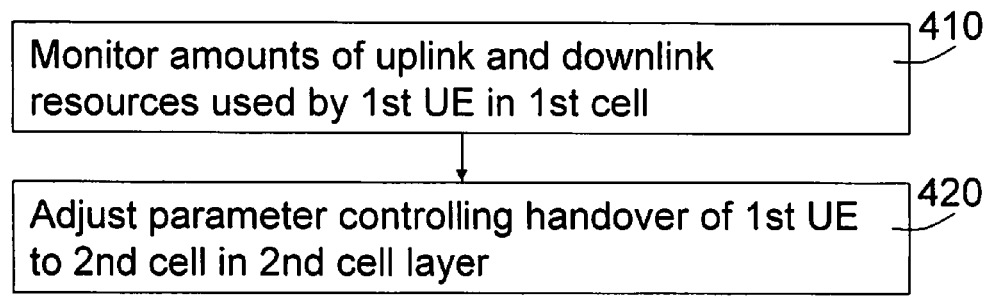
FIGS. 4a-4d are flowcharts of the method in the first BS according to embodiments.

FIG. 4a is a flowchart of the method in a first BS 210a of a wireless communications system, according to embodiments. The first BS is serving a first cell 220a in a first cell layer overlapping with a second cell layer, wherein the first cell has a different distribution of configured amounts of UL and DL resources than a second cell in the second cell layer. The method comprises:

410: Monitoring amounts of UL and DL resources used by a first UE in the first cell. In one embodiment, the monitoring comprises monitoring a current QoS parameter for a bearer of the first UE, such as a guaranteed bit rate.

420: Adjusting at least one parameter controlling a handover of the first UE to the second cell in the second cell layer, based on the monitored amounts of UL and DL resources used by the first UE, and on information regarding configured amounts of UL and DL resources in the first and the second cell respectively. This results in that it is more likely that the first UE will be served by a cell with a good match to a distribution of the monitored amounts of UL and DL resources with regards to a distribution of the configured amounts of UL and DL resources. The at least one parameter controlling the handover may comprise a threshold for triggering the handover. In addition to the threshold for triggering the handover it may also comprise a threshold for triggering measurement reports used for handover decisions.

The adjusting 420 may in embodiments be based also on a load in the first and the second cell, such that it is less likely that the first UE will be served by a cell with a load above a threshold value. As described above, information about a current UL and DL load in the macro and/or pico cells may be exchanged between the involved nodes and used as complementary or refining input data for the adjustment of the handover parameters.

In one embodiment, the adjusting comprises comparing the distribution of the monitored amounts of UL and DL resources used by the first UE, with the distribution of the configured amounts of UL and DL resources in the first and second cell respectively. The adjusting also comprises lowering the threshold for triggering the handover and the threshold for triggering measurement reports, when the second cell has a better match to the distribution of the monitored amounts of UL and DL resources with regards to the distribution of the configured amounts of UL and DL resources. Furthermore, the adjusting comprises increasing the threshold for triggering the handover and the threshold for triggering measurement reports, when the first cell has a better match to the distribution of the monitored amounts of UL and DL resources with regards to the distribution of the configured amounts of UL and DL resources. A cell has a better match if the first UE's monitored usage of UL and DL resources fits better with the cell's configured amount of UL and DL resources, so that the risk of overloading the cell's UL while still having DL resources left, or the opposite, is reduced. A UE which is monitored to use more DL traffic than UL, would thus fit better in a cell which is configured to have more DL resources than UL resources, rather than in a cell with an equal amount of UL and DL resources. In embodiments, the load in the cells may also be taken into account as already described above, so that the UE's monitored usage of UL and DL resources may be matched to the currently available resources in the cells.

The information regarding configured amounts of UL and DL resources in the second cell may be received from a second BS serving the second cell. Alternatively, it may be reported by the first UE, or it may be configured in the first BS. According to another alternative, the information regarding configured amounts of UL and DL resources may be received from a network node controlling the first and second BS, such as a BSC in GSM RAN or an RNC in UTRAN.

Figure 4B:
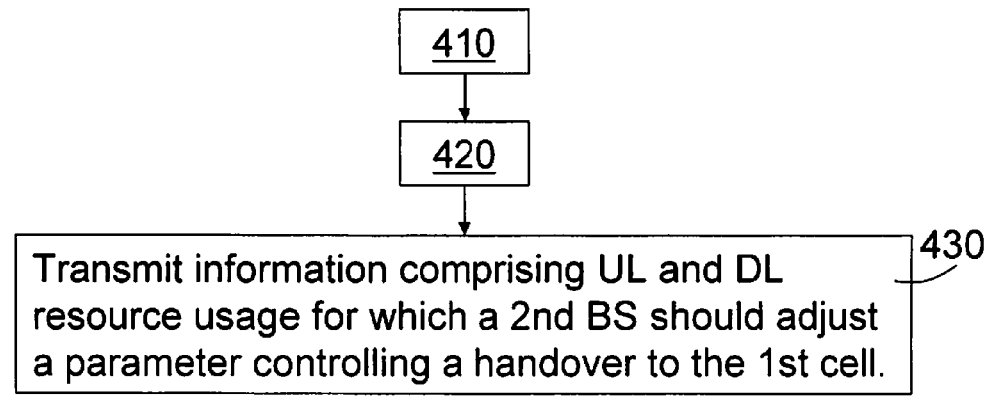

FIG. 4b is a flowchart of the method in the first BS 210a, according to the first embodiment described above. In addition to the monitoring 410 of amounts of UL and DL resources used by the first UE 250a in the first cell 220a, and the adjustment 420 of one or more parameters controlling the handover of the first UE 250a to the second cell 220b, the method further comprises transmitting 430 information to the second BS 210b serving the second cell 220b, the transmitted information comprising an UL and DL resource usage for which the second BS should adjust a parameter controlling a handover to the first cell. This makes it possible for the second BS 210b to adjust parameters controlling the handover to the first cell 220a for any UE in the second cell 220b with an UL and DL resource usage corresponding to the one transmitted from the first BS 210a. In one embodiment, the transmitted information also comprises how to adjust the parameter controlling the handover to the first cell. The second BS is thus not only informed about when a certain UE should be handed over to the first cell layer, but also how much the thresholds should be adjusted.

Figure 4C:
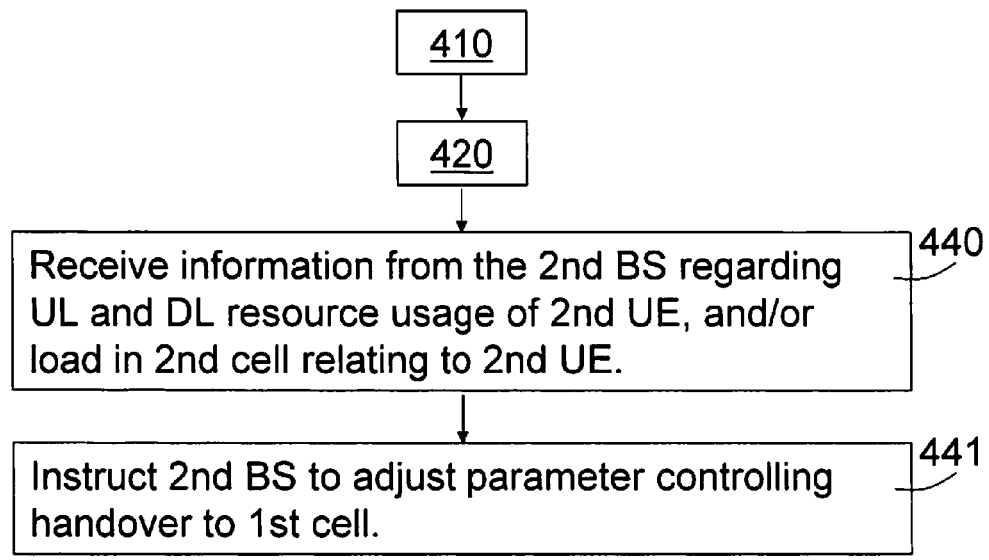

FIG. 4c is a flowchart of the method in the first BS 210a, according to the second embodiment described above. In addition to the monitoring 410 of amounts of UL and DL resources used by the first UE 250a in the first cell 220a, and the adjustment 420 of one or more parameters controlling the handover of the first UE 250a to the second cell 220b, the method further comprises receiving 440 information from the second BS serving the second cell, the received information comprising information regarding at least one of an UL and DL resource usage of a second UE in the second cell, or a load in the second cell relating to the second UE. The information may be received periodically or upon request. Based on the received information, the first BS may instruct 441 the second BS to adjust the parameter controlling the handover to the first cell.

Figure 4D:
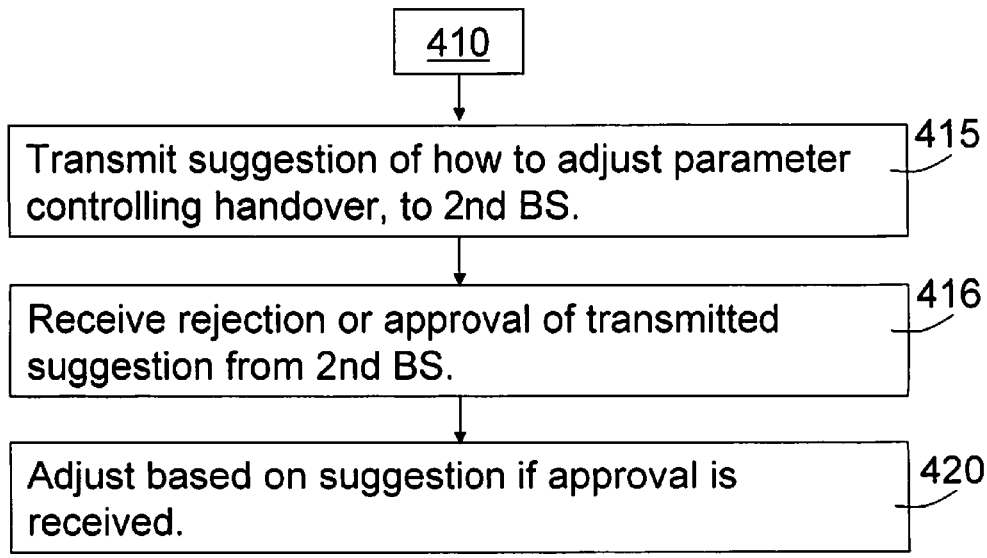

FIG. 4d is a flowchart of the method in the first BS 210a, according to the fourth embodiment described above. In this fourth embodiment the first BS is not in sole control of the handover. The method further comprises transmitting 415 a suggestion of how to adjust the at least one parameter controlling the handover, the suggestion being transmitted to the second BS serving the second cell. The method also comprises receiving 416 a rejection or an approval of the transmitted suggestion, from the second BS. The adjusting 420 may then be performed based on the suggestion, if the approval is received.

In any of the above described embodiments, the configured amount of UL resources may be equal to the configured amount of DL resources in the first cell, and the configured amount of UL resources may be different from the configured amount of DL resources in the second cell. The first cell layer may be an FDD macro layer, and the second cell layer may be a TDD pico layer. This corresponds to the example scenario described with reference to FIG. 2 above.

Figure 5A:
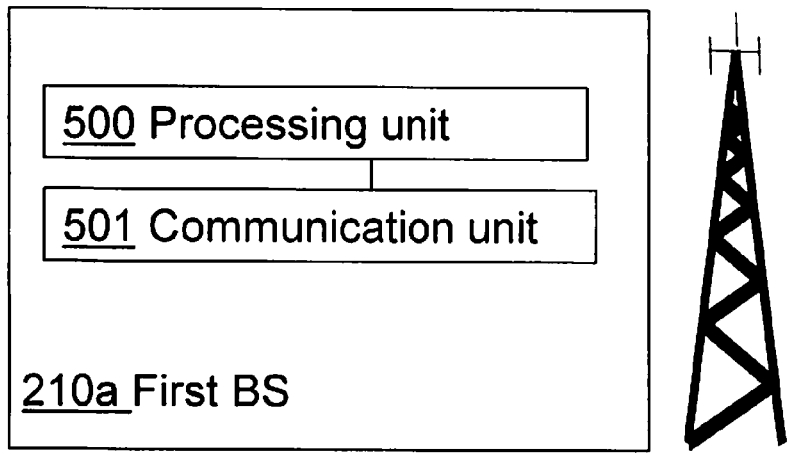
FIGS. 5a-5b are block diagrams illustrating the first BS according to embodiments.

A first BS 210a for a wireless communications system is schematically illustrated in the block diagram in FIG. 5a, according to embodiments. The first BS 210a is configured to control handover and to serve a first cell 220a in a first cell layer overlapping with a second cell layer. The first cell has a different distribution of configured amounts of UL and DL resources than a second cell in the second cell layer. In one embodiment, the configured amount of UL resources is equal to the configured amount of DL resources in the first cell, and the configured amount of UL resources is different from the configured amount of DL resources in the second cell. The first cell layer may be an FDD macro layer, and the second cell layer may be a TDD pico layer. The first BS 210a comprises a processing unit 500 configured to monitor amounts of UL and DL resources used by a first UE 250a in the first cell 220a. The processing unit 500 is also configured to adjust at least one parameter controlling a handover of the first UE 250a to a second cell 220b in the second cell layer, based on the monitored amounts of UL and DL resources used by the first UE 250a, and on information regarding configured amounts of UL and DL resources in the first cell 220a and the second cell 220b respectively, such that it is more likely that the first UE will be served by a cell with a good match to a distribution of the monitored amounts of UL and DL resources with regards to a distribution of the configured amounts of UL and DL resources. Furthermore, the first BS 210a comprises a communication unit 501 for communicating with other BSs. This communication may e.g. be performed over the X2interface between eNodeBs in E-UTRAN.

The processing unit 500 may be configured to adjust the at least one parameter controlling the handover based also on a load in the first and the second cell, such that it is less likely that the first UE will be served by a cell with a load above a threshold value. The at least one parameter controlling the handover may comprise a threshold for triggering the handover. It may also comprise a threshold for triggering measurement reports used for handover decisions.

The processing unit 500 may in embodiments be configured to adjust the at least one parameter controlling the handover by comparing the distribution of the monitored amounts of UL and DL resources used by the first UE, with the distribution of the configured amounts of UL and DL resources in the first and second cell respectively. The processing unit 500 may also be configured to adjust the at least one parameter controlling the handover by lowering the threshold for triggering the handover and the threshold for triggering measurement reports, when the second cell has a better match to the distribution of the monitored amounts of UL and DL resources with regards to the distribution of the configured amounts of UL and DL resources, and increasing the threshold for triggering the handover and the threshold for triggering measurement reports, when the first cell has a better match to the distribution of the monitored amounts of UL and DL resources with regards to the distribution of the configured amounts of UL and DL resources.

The information regarding configured amounts of UL and DL resources in the second cell may in alternative embodiments be received from a second BS serving the second cell, reported by the first UE, configured in the first BS, or received from a network node controlling the first and second BS. The processing unit 500 may in any of the embodiments be configured to monitor the amounts of UL and DL resources used by a first UE in the first cell by monitoring the UEs recent traffic or by monitoring a current QoS parameter for a bearer of the first UE.

According to the first embodiment described above, the processing unit 500 is further configured to transmit information to the second BS serving the second cell, the transmitted information comprising an UL and DL resource usage for which the second BS should adjust a parameter controlling a handover to the first cell. The transmitted information may also comprise how to adjust the parameter controlling the handover to the first cell.

According to the second embodiment described above, the processing unit 500 is further configured to receive information from the second BS serving the second cell, the received information comprising information regarding an UL and DL resource usage of a second UE in the second cell and/or a load in the second cell relating to the second UE. The processing unit 500 may be configured to receive the information periodically or upon request. The processing unit 500 may according to the second embodiment also be configured to instruct the second BS to adjust the parameter controlling the handover to the first cell, based on the received information.

According to the fourth embodiment described above, the processing unit 500 is further configured to transmit a suggestion of how to adjust the at least one parameter controlling the handover. The suggestion is transmitted to the second BS serving the second cell. The processing unit 500 is also configured to receive a rejection or an approval of the transmitted suggestion from the second BS, and to adjust the one or more parameters controlling the handover based on the suggestion if the approval is received.

The units described above with reference to FIG. 5a are logical units and do not necessarily correspond to separate physical units.

Figure 5B:
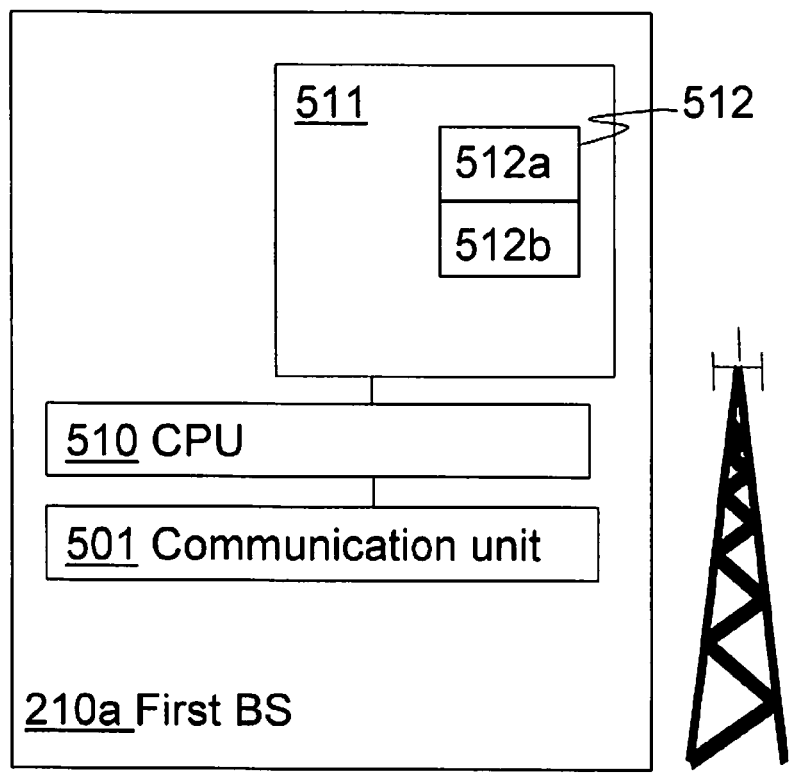

FIG. 5b schematically illustrates an embodiment of the first BS 210a, which is an alternative way of disclosing the embodiment illustrated in FIG. 5a. The first BS 210a comprises the communication unit 501 already described above with reference to FIG. 5a. The first BS 210a also comprises a Central Processing Unit (CPU) 510 which may be a single unit or a plurality of units. Furthermore, the first BS 210a comprises at least one computer program product 511 in the form of a non-volatile memory, e.g. an EEPROM (Electrically Erasable Programmable Read-Only Memory), a flash memory or a disk drive. The computer program product 511 comprises a computer program 512, which comprises code means which when run on the first BS 210a causes the CPU 510 on the first BS 210a to perform the steps of the procedures described earlier in conjunction with FIG. 4a.

Hence in the embodiments described, the code means in the computer program 512 of the first BS 210a comprises a module 512a for monitoring amounts of UL and DL resources used by a first UE in the first cell. The computer program 512 also comprises a module 512b for adjusting a parameter controlling a handover of the first UE to a second cell in the second cell layer. The code means may thus be implemented as computer program code structured in computer program modules. The modules 512a-b essentially perform the steps of the flow in FIG. 4a to emulate the first BS described in FIG. 5a. In other words, when the different modules 512a-b are run on the CPU 510, they correspond to the processing unit 500 of FIG. 5a.

Although the code means in the embodiments disclosed above in conjunction with FIG. 5b are implemented as computer program modules, one or more of the code means may in alternative embodiments be implemented at least partly as hardware circuits.

The above mentioned and described embodiments are only given as examples and should not be limiting. Other solutions, uses, objectives, and functions within the scope of the accompanying patent claims may be possible.

ABBREVIATIONS

3GPP 3rd Generation Partnership Project
BS Base Station
BSC Base Station Controller
DL Downlink
eNB E-UTRAN NodeB
eNodeB E-UTRAN NodeB
E-UTRAN Evolved UTRAN
FDD Frequency Division Duplex
GSM Global System for Mobile communications
HetNet Heterogeneous Networks
LTE Long Term Evolution
MME Mobility Management Entity
O&M Operation and Maintenance
QoS Quality of Service
RNC Radio Network Controller
TDD Time Division Duplex
UE User Equipment
UL Uplink
UMTS Universal Mobile Telecommunication System
UTRAN Universal Terrestrial Radio Access Network
X2The interface between two eNBs in EPS X2AP X2Application Protocol (the protocol used on the X2interface)

The invention claimed is:

1. A method in a first base station of a wireless communications system for controlling handover, the first base station serving a first cell in a first cell layer overlapping with a second cell layer, wherein the first cell has a different distribution of configured amounts of uplink and downlink resources than a second cell in the second cell layer, the method comprising:
monitoring amounts of uplink and downlink resources utilized by a first user equipment in the first cell to determine a level of symmetry of the first user equipment's uplink and downlink traffic;
adjusting at least one parameter controlling a handover of the first user equipment to the second cell in the second cell layer, based on the determined level of symmetry of the first user equipment's uplink and downlink traffic, and on information regarding a distribution of configured amounts of uplink and downlink resources in the first cell and the second cell, respectively, to increase a likelihood that the first user equipment will be served by one of the first or second cells in which the distribution of configured amounts of uplink and downlink resources better matches the determined level of symmetry of the first user equipment's uplink and downlink traffic; and
transmitting information to the second base station serving the second cell, the transmitted information comprising an uplink and downlink resource usage for which the second base station should adjust a parameter controlling a handover to the first cell.

2. The method according to claim 1, wherein the adjusting is further based also on a load in the first and the second cell, such that it is less likely that the first user equipment will be served by one of the first or second cells having a load above a threshold value.

3. The method according to claim 1, wherein the at least one parameter controlling the handover comprises a threshold for triggering the handover.

4. The method according to claim 3, wherein the at least one parameter controlling the handover comprises a threshold for triggering measurement reports used for handover decisions.

5. The method according to claim 4, wherein the adjusting comprises:
comparing the determined level of symmetry of the first user equipment's uplink and downlink traffic with the distribution of the configured amounts of uplink and downlink resources in the first and second cell, respectively;
lowering the threshold for triggering the handover and the threshold for triggering measurement reports, when the second cell has a better match for the determined level of symmetry of the first user equipment's uplink and downlink traffic with regards to the distribution of the configured amounts of uplink and downlink resources in the second cell; and
increasing the threshold for triggering the handover and the threshold for triggering measurement reports, when the first cell has a better match for the determined level of symmetry of the first user equipment's uplink and downlink traffic with regards to the distribution of the configured amounts of uplink and downlink resources in the first cell.

6. The method according to claim 1, further comprising:
receiving information from the second base station serving the second cell, the received information comprising information regarding at least one of:
a level of symmetry of uplink and downlink resource usage of a second user equipment in the second cell; and
a load in the second cell relating to the second user equipment; and
instructing the second base station to adjust the parameter controlling the handover to the first cell, based on the received information.

7. The method according to claim 1, further comprising:
transmitting a suggestion of how to adjust the at least one parameter controlling the handover, the suggestion being transmitted to the second base station serving the second cell; and
receiving a rejection or an approval of the transmitted suggestion, from the second base station;
wherein the adjusting is performed based on the suggestion if the approval is received.

8. The method according to claim 1, wherein the configured amount of uplink resources is equal to the configured amount of downlink resources in the first cell, and the configured amount of uplink resources is different from the configured amount of downlink resources in the second cell.

9. The method according to claim 1, wherein the first cell layer is a Frequency Division Duplex (FDD) macro layer, and the second cell layer is a Time Division Duplex (TDD) pico layer.

10. A first base station for a wireless communications system, the first base station being configured to control handover and to serve a first cell in a first cell layer overlapping with a second cell layer, wherein the first cell has a different distribution of configured amounts of uplink and downlink resources than a second cell in the second cell layer, the first base station comprising a processing unit configured to:
monitor amounts of uplink and downlink resources utilized by a first user equipment in the first cell to determine a level of symmetry of the first user equipment's uplink and downlink traffic;
adjust at least one parameter controlling a handover of the first user equipment to the second cell in the second cell layer, based on the determined level of symmetry of the first user equipment's uplink and downlink traffic, and on information regarding a distribution of configured amounts of uplink and downlink resources in the first cell and the second cell, respectively, to increase a likelihood that the first user equipment will be served by one of the first or second cells in which the distribution of configured amounts of uplink and downlink resources better matches the determined level of symmetry of the first user equipment's uplink and downlink traffic; and
transmit information to the second base station serving the second cell, the transmitted information comprising an uplink and downlink resource usage for which the second base station should adjust a parameter controlling a handover to the first cell.

11. The first base station according to claim 10, wherein the processing unit is configured to adjust the at least one parameter controlling the handover based also on a load in the first and the second cell, such that it is less likely that the first user equipment will be served by one of the first or second cells having a load above a threshold value.

12. The first base station according to claim 10, wherein the at least one parameter controlling the handover comprises a threshold for triggering the handover.

13. The first base station according to claim 12, wherein the at least one parameter controlling the handover comprises a threshold for triggering measurement reports used for handover decisions.

14. The first base station according to claim 13, wherein the processing unit is configured to adjust the at least one parameter controlling the handover by:
   comparing the determined level of symmetry of the first user equipment's uplink and downlink traffic with the distribution of the configured amounts of uplink and downlink resources in the first and second cell, respectively;
   lowering the threshold for triggering the handover and the threshold for triggering measurement reports, when the second cell has a better match for the determined level of symmetry of the first user equipment's uplink and downlink traffic with regards to the distribution of the configured amounts of uplink and downlink resources in the second cell; and
   increasing the threshold for triggering the handover and the threshold for triggering measurement reports, when the first cell has a better match for the determined level of symmetry of the first user equipment's uplink and downlink traffic with regards to the distribution of the configured amounts of uplink and downlink resources in the first cell.

15. The first base station according to claim 10, wherein the processing unit is further configured to:
   receive information from the second base station serving the second cell, the received information comprising information regarding at least one of:
      a level of symmetry of uplink and downlink resource usage of a second user equipment in the second cell; and
      a load in the second cell relating to the second user equipment; and
   instruct the second base station to adjust the parameter controlling the handover to the first cell, based on the received information.

16. The first base station according to claim 10, wherein the processing unit is further configured to:
   transmit a suggestion of how to adjust the at least one parameter controlling the handover, the suggestion being transmitted to the second base station serving the second cell;
   receive a rejection or an approval of the transmitted suggestion, from the second base station; and
   adjust the at least one parameter controlling the handover based on the suggestion if the approval is received.

17. The first base station according to claim 10, wherein the configured amount of uplink resources is equal to the configured amount of downlink resources in the first cell, and the configured amount of uplink resources is different from the configured amount of downlink resources in the second cell.

18. The first base station according to claim 10, wherein the first cell layer is a Frequency Division Duplex (FDD) macro layer, and the second cell layer is a Time Division Duplex (TDD) pico layer.

* * * * *